(12) United States Patent
Yang

(10) Patent No.: US 12,210,396 B2
(45) Date of Patent: Jan. 28, 2025

(54) APPLICATION FREEZING CONTROL METHOD AND DEVICE, TERMINAL, AND READABLE STORAGE MEDIUM

(71) Applicant: ZTE Corporation, Shenzhen (CN)

(72) Inventor: Sihai Yang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 537 days.

(21) Appl. No.: 17/619,147

(22) PCT Filed: May 8, 2020

(86) PCT No.: PCT/CN2020/089216
§ 371 (c)(1),
(2) Date: Dec. 14, 2021

(87) PCT Pub. No.: WO2021/000648
PCT Pub. Date: Jan. 7, 2021

(65) Prior Publication Data
US 2022/0357789 A1   Nov. 10, 2022

(30) Foreign Application Priority Data
Jul. 2, 2019   (CN) .......................... 201910591068.4

(51) Int. Cl.
G06F 1/32        (2019.01)
G06F 1/3234    (2019.01)

(52) U.S. Cl.
CPC .................................. *G06F 1/3234* (2013.01)

(58) Field of Classification Search
CPC ....................................................... G06F 1/32
See application file for complete search history.

(56) References Cited

U.S. PATENT DOCUMENTS 10,817,307 B1 *  10/2020  De La Cropte De Chanterac ...... G06F 1/3212
2018/0157498 A1 *  6/2018  Borlick ................. G06F 11/106

FOREIGN PATENT DOCUMENTS

CN      101281486 A      10/2008
CN      103049319 A       4/2013
(Continued)

OTHER PUBLICATIONS

International Searching Authority. International Search Report and Written Opinion for PCT Application No. PCT/CN2020/089216 and English translation, mailed Aug. 11, 2020, pp. 1-12.
(Continued)

*Primary Examiner* — Paul B Yanchus, III
(74) *Attorney, Agent, or Firm* — Vivacqua Crane, PLLC

(57) ABSTRACT

An application freezing control method and device, a terminal, and a non-transitory computer-readable storage medium are disclosed. The method may include: updating, after freezing detection processing for currently running applications is triggered based on a current cyclic detection time interval, the cyclic detection time interval in response to determining, based on a current application running state of the terminal device, that the cyclic detection time interval needs to be updated (S101); and determining, based on the updated cyclic detection time interval, whether the freezing detection processing needs to be performed on the currently running applications (S102).

16 Claims, 3 Drawing Sheets

---

S101
Update, after freezing detection processing for applications is triggered based on a current cyclic detection time interval, the cyclic detection time interval in response to determining, based on a current application running state of a terminal device, that the cyclic detection time interval needs to be updated S102
Continue to determine, based on the updated cyclic detection time interval, whether freezing detection processing needs to be performed on the currently running applications

(56) References Cited

FOREIGN PATENT DOCUMENTS

| | | | |
|---|---|---|---|
| CN | 106126305 | A | 11/2016 |
| CN | 106295275 | A | 1/2017 |
| CN | 107329772 | A | 11/2017 |
| CN | 107450969 | A | 12/2017 |
| CN | 107491348 | A | 12/2017 |
| CN | 109543401 | A | 3/2019 |
| CN | 109739632 | A | 5/2019 |
| WO | 2015184885 | A1 | 12/2015 |

OTHER PUBLICATIONS

European Patent Office. Extended European Search Report for EP Application No. 20834494.5, mailed Sep. 29, 2022, pp. 1-9.

* cited by examiner

APPLICATION FREEZING CONTROL METHOD AND DEVICE, TERMINAL, AND READABLE STORAGE MEDIUM

CROSS-REFERENCE TO RELATED APPLICATION

This application is a national stage filing under 35 U.S.C. § 371 of international application number PCT/CN2020/089216, filed on May 8, 2020, which claims priority to Chinese patent application No. 201910591068.4 filed on Jul. 2, 2019. The contents of these applications are incorporated herein by reference in their entirety.

TECHNICAL FIELD

The embodiments of the present disclosure relate to, but are not limited to, the field of terminal devices, and in particular to, but are not limited to, an application program (hereinafter referred to as application for short) freezing control method and device, a terminal device and a non-transitory computer-readable storage medium.

BACKGROUND

With more and more terminal device applications being available to terminal devices, the functions of the applications are becoming more and more abundant and powerful, and users usually install many applications in their terminal devices. Some of the applications on a terminal device are pre-installed on the terminal device, and some are installed by the user during subsequent use. In the process of use, a large number of programs running in the background often occupy a lot of terminal device resources, thus affecting the terminal device performance and battery life, and further affecting the user experience. In this regard, freezing control technology has emerged in the existing technology to control applications running in the background so as to improve the terminal device performance and battery life, where a trigger condition, such as a battery level threshold, is preset for freezing detection and a one-time freezing control is performed once the trigger condition is satisfied (for example, when the battery level of the terminal device is lower than that battery level threshold). In the current freezing control technology, the preset trigger condition for freezing detection is fixed. This results in poor flexibility, rationality and freezing effect of freezing control and low user satisfaction due to poor user experience.

SUMMARY

An application freezing control method and device, a terminal device and a non-transitory computer-readable storage medium provided by the embodiments of the present disclosure at least solve one of the technical problems in the existing technology to a certain extent.

An embodiment of the present disclosure provides an application freezing control method applied to a terminal device, which may include: updating, after freezing detection processing for currently running applications is triggered based on a current cyclic detection time interval, the cyclic detection time interval in response to determining, based on a current application running state of the terminal device, that the cyclic detection time interval needs to be updated; and determining, based on the updated cyclic detection time interval, whether the freezing detection processing needs to be performed on the currently running applications.

Another embodiment of the present disclosure further provides an application freezing control device, which may include: a control module configured to update, after freezing detection processing for currently running applications is triggered based on a current cyclic detection time interval, the cyclic detection time interval in response to determining that the cyclic detection time interval needs to be updated; and to determine, based on the updated cyclic detection time interval, whether the freezing detection processing needs to be performed on the currently running applications.

Another embodiment of the present disclosure further provides a terminal device, which may include a processor, a memory and a communication bus, where the communication bus is configured to connect the processor and the memory; and the processor is configured to execute a computer program stored in the memory to implement the steps of the application freezing control method as described above.

Another embodiment of the present disclosure further provides a non-transitory computer-readable storage medium storing one or more computer programs executable by one or more processors to implement the steps of the application freezing control method as described above.

Other features and corresponding beneficial effects of the present disclosure are explained in the subsequent description, and it should be understood that at least some of the beneficial effects become apparent from the description of the present disclosure.

DETAILED DESCRIPTION

In order to make the objective, technical schemes and advantages of the present disclosure clearly understood, the embodiments of the present disclosure will be further illustrated in detail by means of specific embodiments in conjunction with the accompanying drawings. It should be understood that the specific embodiments described here are intended only to explain the present disclosure and are not intended to limit the present disclosure.

It will be understood by those having ordinary skill in the art that in the following embodiments of the present disclosure, a terminal device may be a mobile phone, a tablet computer, a laptop computer, a hand-held computer, a smart television, a mobile Internet-connected device, a wearable device, or any other terminal device on which a client application may be installed, or any other terminal device or device that can implement the application processing method of the embodiments of the present disclosure, which is not limited in the present disclosure.

Example Embodiment I

In view of the problems of poor flexibility, rationality, and freezing effect of freezing control and low user satisfaction in the existing freezing control technology, in this embodiment, by setting a cyclic detection time interval, cyclic freezing detection processing may be performed on the terminal device according to that cyclic detection time interval, thus improving the rationality of freezing detection processing and the freezing effect; and in some examples of this embodiment, the cyclic detection time interval may be dynamically updated in a rational manner during use, thereby improving the flexibility of freezing detection control and further improving the rationality of freezing detection processing and the freezing effect.

Figure 1:
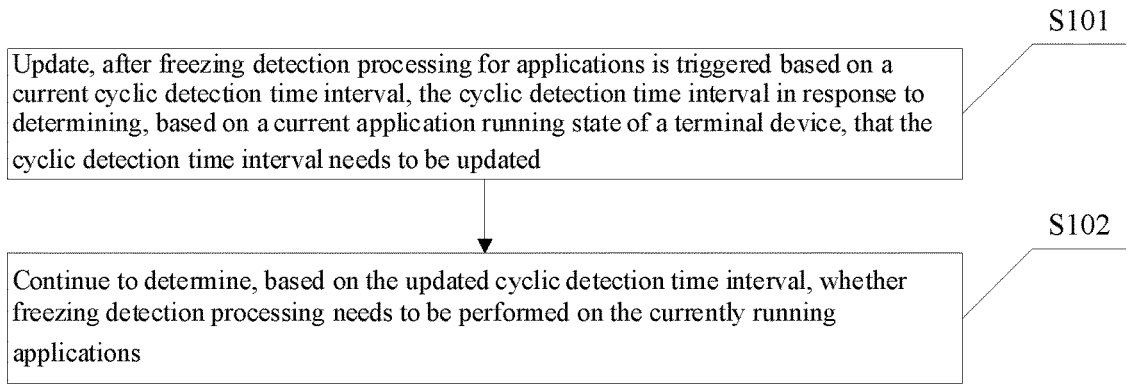
FIG. 1 is a flowchart of an application freezing control method according to Embodiment I of the present disclosure.

For the convenience of understanding, this embodiment will be illustrated below with the flow of the application freezing control method shown in FIG. 1 as an example, as shown in FIG. 1, including the following step.

At step S101, after freezing detection processing for currently running applications is triggered based on a current cyclic detection time interval, the cyclic detection time interval is updated in response to determining, based on a current application running state of the terminal device, that the cyclic detection time interval needs to be updated.

The cyclic detection time interval in this embodiment is a condition under which the terminal device may cyclically determine whether freezing detection processing needs to be performed on the currently running applications. The object of freezing control in this embodiment includes the currently running applications in the terminal device, which may include at least one of an application currently running in the foreground or an application currently running in the background. For example, in some examples, the freezing detection processing may be performed only for the applications currently running in the background; and in some other examples, the freezing detection processing may be performed for both the applications currently running in the background and the applications running in the foreground.

Figure 2:
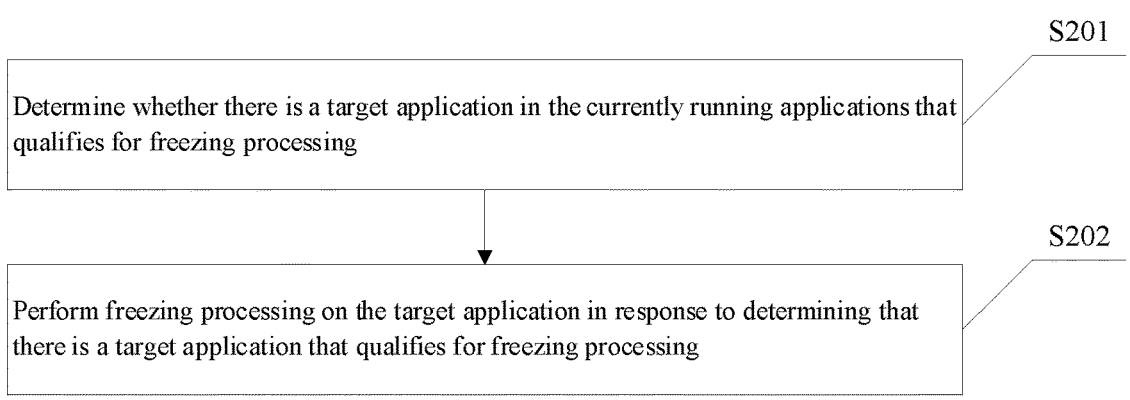
FIG. 2 is a flowchart of freezing detection processing for applications according to Embodiment I of the present disclosure.

In this embodiment, the freezing detection processing for the currently running applications in the terminal device is triggered in response to the cyclic detection time interval being satisfied. In an example, reference may be made to FIG. 2 for the process of freezing detection processing of the currently running applications. The process includes the following steps.

At step S201, it is determined whether there is a target application in the currently running applications that qualifies for freezing processing.

In this step, in response to freezing control being performed only for the applications running in the background, only the applications currently running in the background of the terminal device may be acquired; and in response to freezing control being performed for the applications running both in the background and foreground, the applications currently running in the foreground and background of the terminal device may be acquired; and it is then determined whether the acquired currently running applications meet the freezing processing condition. It should be understood that the freezing processing condition in this embodiment may be set flexibly depending on the specific freezing processing method adopted. In some examples of this embodiment, the freezing processing method may include, but is not limited to, any one of disabling the application, freezing the application, and clearing the application.

At step S202, the freezing processing is performed on the target application in response to determining that there is a target application that qualifies for freezing processing.

For example, in an example, when the freezing processing method adopts the freezing mode, freezing processing is performed on the target application that satisfies the freezing condition (for example, the freezing condition may be that the application is running in the background and the application is a non-freeze-protected application, where a freeze-protected application in this embodiment is an application that does not require freezing processing, and the list of applications for freeze-protected applications may support, but is not limited to, flexible settings or updates by at least one of the application provider, the terminal device vendor, or the user). For example, in another example, when the freezing processing method adopts the disabling mode, disabling processing is performed on the target application that satisfies the disabling condition. For another example, in some embodiments, when the freezing processing method adopts the mode of clearing an application, clearing processing is performed on the target application that satisfies the clearing condition.

In this embodiment, the approach to determine whether the cyclic detection time interval needs to be updated may also be set flexibly depending on specific application scenarios. In some examples of this embodiment, in response to determining that the cyclic detection time interval does not need to be updated, the current cyclic detection time interval is still used to continue to determine whether the freezing detection processing needs to be performed on the currently running applications.

At step S102, based on the updated cyclic detection time interval, a determination is continued as to whether the freezing detection processing needs to be performed on the currently running applications. That is, in response to determining that the updated cyclic detection time interval is satisfied, it is determined that the freezing detection processing needs to be performed on the currently running applications.

For the convenience of understanding, this embodiment will be illustrated below in conjunction with examples of determining, based on several detected application running states, whether the cyclic detection time interval needs to be updated.

Example one: it may be determined, based on a change in applications that are currently under freezing control, whether the cyclic detection time interval needs to be updated. In this example, a list of freezing control may be set to store the applications that are currently under freezing control; and after freezing control has been performed on an application, the application is added to this list of freezing control. Therefore, by detecting whether the list of freezing control is empty as regards applications, it may be determined whether there is currently an application that is under freezing control. In this case, in this example, in response to detecting at least one of the following application running states, it may be determined that the cyclic detection time interval needs to be updated:

in response to a change from empty to non-empty as regards applications in the list of freezing control being detected, that is, after freezing detection processing for currently running applications is triggered based on the current cyclic detection time interval, a change from empty to non-empty as regards applications in the list of freezing control is discovered, it is determined that the cyclic detection time interval needs to be updated; or in response to a change from non-empty to empty as regards applications in the list of freezing control being detected, that is, after freezing detection processing for currently running applications is triggered based on the current cyclic detection time interval, a change from non-empty to empty as regards applications in the list of freezing control is discovered, it is determined that the cyclic detection time interval needs to be updated.

Example two: it may be determined, based on a change in whether there are abnormally running applications, whether the cyclic detection time interval needs to be updated. In this example, a list of abnormal applications may be set up to store applications that are currently running abnormally; that is, when an application is detected to be running abnormally, that application is added to that list of abnormal applications. Thus, by detecting whether that list of abnormal applications is empty as regards applications, it may be determined whether there is currently an abnormally running application. In this embodiment, to determine whether an application is running abnormally, corresponding abnormality detection conditions may be set according to specific needs, for example, whether the application is running in the background with high power consumption behaviors, whether the application has illegal access to system resources, whether the application has virus program behaviors, whether the application fails to execute the corresponding functions normally, and so on.

In this case, in this example, in response to at least one of the following application running states being detected, it may be determined that the cyclic detection time interval needs to be updated:

in response to a change from empty to non-empty as regards applications in the list of abnormal applications being detected, that is, after freezing detection processing for currently running applications is triggered based on the current cyclic detection time interval, a change from empty to non-empty as regards applications in the list of abnormal applications is discovered, it is determined that the cyclic detection time interval needs to be updated; or in response to a change from non-empty to empty as regards applications in the list of abnormal applications being detected, that is, after freezing detection processing for currently running applications is triggered based on the current cyclic detection time interval, a change from non-empty to empty as regards applications in the list of abnormal applications is discovered, it is determined that the cyclic detection time interval needs to be updated.

Example three: it may also be determined, in combination with a change in whether there are abnormally running applications and a change in applications that are currently under freezing control, whether the cyclic detection time interval needs to be updated. In this case, in this example, it may be configured so that, in response to at least one of the following application running states being detected, it may be determined that the cyclic detection time interval needs to be updated.

Case one: a change from empty to non-empty as regards applications in a list of freezing control is detected.

Case two: a change from non-empty to empty as regards applications in the list of freezing control is detected.

Case three: a change from empty to non-empty as regards applications in a list of abnormal applications is detected.

Case four: a change from non-empty to empty as regards applications in the list of abnormal applications is detected.

In this example, when several cases among the above four cases are detected at the same time, it may be configured so that the cyclic detection time interval may be updated according to the cyclic detection time interval update method corresponding to any of the cases; and also, a corresponding priority may be set for each case, and the cyclic detection time interval may be updated according to the cyclic detection time interval update method corresponding to the case with a higher priority. For example, when case one and case three, or case two and case three, are detected at the same time, case three may be set to have a higher priority than case one and case two. For another example, when case four and case one are detected at the same time, case one may be set to have a higher priority than case four. For another example, when case four and case two are detected at the same time, case two and case four may be set to have the same priority, where case two and case four may adopt the same cyclic detection time interval update method.

In the above example one, updating the cyclic detection time interval may include: the cyclic detection time interval may be decreased in response to detecting a change from empty to non-empty as regards applications in the list of freezing control; and the cyclic detection time interval may be increased in response to detecting a change from non-empty to empty as regards applications in the list of freezing control. In example one, for example, two cyclic detection time intervals $T_0$ and $T_1$ may be set, and $T_0$ may be set to be greater than $T_1$, where increasing the cyclic detection time interval may be updating the cyclic detection time interval from $T_0$ to $T_1$, while decreasing the cyclic detection time interval may be updating the cyclic detection time interval from $T_1$ to $T_0$.

In the above example two, updating the cyclic detection time interval may include: the cyclic detection time interval may be decreased in response to detecting a change from empty to non-empty as regards applications in the list of abnormal applications; and the cyclic detection time interval may be increased in response to detecting a change from non-empty to empty as regards applications in the list of abnormal applications. Following the above example one, in this example, increasing the cyclic detection time interval may also be updating the cyclic detection time interval from $T_0$ to $T_1$, while decreasing the cyclic detection time interval may also be updating the cyclic detection time interval from $T_1$ to $T_0$.

In the above example three, updating the cyclic detection time interval includes, but is not limited to, at least one of the following:

decreasing the cyclic detection time interval in response to detecting a change from empty to non-empty as regards applications in the list of freezing control and the maintenance of empty as regards applications in the list of abnormal applications, or in response to detecting a change from empty to non-empty as regards applications in the list of abnormal applications; or increasing the cyclic detection time interval in response to detecting a change from non-empty to empty as regards applications in the list of freezing control and the maintenance of empty as regards applications in the list of abnormal applications, or in response to detecting a change from non-empty to empty as regards applications in the list of abnormal applications.

For example, in example three, three cyclic detection time intervals $T_0$, $T_1$ and $T_2$ may be set, and $T_0$ may be set to be greater than $T_1$ and $T_1$ greater than $T_2$. In this case, in example three, decreasing the cyclic detection time interval in response to detecting a change from empty to non-empty as regards applications in the list of freezing control and the maintenance of empty as regards applications in the list of abnormal applications, or in response to detecting a change from empty to non-empty as regards applications in the list of abnormal applications may include, but is not limited to:

updating the cyclic detection time interval from $T_0$ to $T_1$ in response to detecting a change from empty to non-empty as regards applications in the list of freezing control and the maintenance of empty as regards applications in the list of abnormal applications; and updating the cyclic detection time interval from $T_0$ or $T_1$ to $T_2$ in response to detecting a change from empty to non-empty as regards applications in the list of abnormal applications. For example, in response to detecting a change from empty to non-empty as regards applications in the list of abnormal applications, if the list of freezing control was empty as regards applications before, in which case the cyclic detection time interval used was $T_0$, then the cyclic detection time interval is updated from $T_0$ to $T_2$. For another example, in response to detecting a change from empty to non-empty as regards applications in the list of abnormal applications, if the list of freezing control was non-empty as regards applications before, in which case the cyclic detection time interval used was $T_1$, then the cyclic detection time interval is updated from $T_1$ to $T_2$.

In example three, increasing the cyclic detection time interval in response to detecting a change from non-empty to empty as regards applications in the list of freezing control and the maintenance of empty as regards applications in the list of abnormal applications, or in response to detecting a change from non-empty to empty as regards applications in the list of abnormal applications includes:

updating the cyclic detection time interval from $T_1$ to $T_0$ in response to detecting a change from non-empty to empty as regards applications in the list of freezing control and the maintenance of empty as regards applications in the list of abnormal applications, $T_0$ being greater than $T_1$; and updating the cyclic detection time interval from $T_2$ to $T_1$ or $T_0$ in response to detecting a change from non-empty to empty as regards applications in the list of abnormal applications. For example, in response to detecting a change from non-empty to empty as regards applications in the list of abnormal applications, if the list of freezing control is currently empty as regards applications, then the cyclic detection time interval is updated from $T_2$ to $T_1$. For another example, in response to detecting a change from non-empty to empty as regards applications in the list of abnormal applications, if the list of freezing control is non-empty as regards applications, then the cyclic detection time interval is updated from $T_2$ to $T_1$.

In some examples of this embodiment, the value (for example, the above $T_0$, $T_1$ and $T_2$) of the cyclic detection time interval may also be dynamically updated, thus further improving the rationality and flexibility of freezing control. For example, the value update condition for the cyclic detection time interval may be set so that the value of the cyclic detection time interval may be updated in response to detecting that the value update condition is satisfied, that is, in response to detecting that the value of the cyclic detection time interval needs to be updated.

For example, in some examples, detecting whether the value of the cyclic detection time interval needs to be updated may include, but is not limited to: based on the correspondence between the value of the cyclic detection time interval and at least one of a time of day, a battery level of the terminal device, a location of the terminal device, a screen-on or screen-off state of the terminal device, and a duration of continuous wake-up or sleep of the terminal device, determining whether the value of the cyclic detection time interval currently needs to be updated.

For example, in some application scenarios, the correspondence between the battery level of the terminal device and the value of the cyclic detection time interval may be set as shown in Table 1 below. In this example, it may be determined, based on the current battery level of the terminal device and the correspondence shown in Table 1, whether the value of the cyclic detection time interval needs to be updated.

TABLE 1

| Battery level of terminal device | Values of cyclic detection time interval $T_0$, $T_1$, and $T_2$ |
| --- | --- |
| 0%-20% | $T_0 = t_{01}$, $T_1 = t_{11}$, $T_2 = t_{21}$ |
| 20%-60% | $T_0 = t_{02}$, $T_1 = t_{12}$, $T_2 = t_{22}$ |
| 60%-100% | $T_0 = t_{03}$, $T_1 = t_{13}$, $T_2 = t_{23}$ |

For another example, in some other application scenarios, the correspondence between the duration of continuous sleep of the terminal device and the value of the cyclic detection time interval may be set as shown in Table 2 below. In this example, it may be determined, based on the current duration of continuous sleep of the terminal device and the correspondence shown in Table 2, whether the value of the cyclic detection time interval needs to be updated.

TABLE 2

| Duration of continuous sleep | Values of cyclic detection time interval $T_0$, $T_1$, and $T_2$ |
| --- | --- |
| 0-30 minutes | $T_0 = t_{01}$, $T_1 = t_{11}$, $T_2 = t_{21}$ |
| 30-60 minutes | $T_0 = t_{02}$, $T_1 = t_{12}$, $T_2 = t_{22}$ |
| 60-100 minutes | $T_0 = t_{03}$, $T_1 = t_{13}$, $T_2 = t_{23}$ |

Approaches of determining, based on the correspondence between the value of the cyclic detection time interval and one or a combination of at least two of the factors such as the time of day, the location of the terminal device, and the screen-on or screen-off state of the terminal device, whether the value of the cyclic detection time interval needs to be updated can be carried out in a similar way and thus will not be described in detail here.

In this embodiment, in the process of determining, based on the cyclic detection time interval, whether the freezing detection processing needs to be performed on the currently running applications, a timer may be used for timing, and when the timing value of the timer reaches the current value of the cyclic detection time interval, it is determined that the cyclic detection time interval is reached, and at this point, it is determined that the freezing detection processing needs to be performed on the currently running application. In some examples of this embodiment, in the process of using the timer for timing in order to determine whether the freezing detection processing needs to be performed on the currently running applications, the timer may be controlled to sleep and stop timing in response to detecting that the terminal device has entered a sleep state, and after detecting that the terminal device has switched from the sleep state to a wake-up state, the timer may be woken up to continue timing. That is, the timer also enters a sleep state when the terminal device enters the sleep state, so that the freezing of the terminal device may be further enhanced.

It may be seen that the application freezing control method provided in this embodiment not only can carry out cyclic freezing detection processing on the terminal device by setting the cyclic detection time interval, thus improving the rationality of the freezing detection processing and the freezing effect; but also can dynamically update the cyclic detection time interval in a rational manner during use, thus improving the flexibility of the freezing detection control and further improving the rationality of the freezing detection processing and the freezing effect, and also improving the safety performance of the terminal device.

Example Embodiment II

For the convenience of understanding, this embodiment will be illustrated below in conjunction with an example of performing application freezing control on a terminal device running an Android system.

In this embodiment, the freezing technology may limit the occupation of system resources by an application, for example, it may include, but is not limited to, prohibiting the occupation of at least one of CPU resources, sensor resources, Global Positioning System (GPS) resources, memory and other peripheral resources, and thus may effectively save power consumption and extend battery life. It should be understood, of course, that the energy-saving processing is not limited to the freezing technology exemplified in this embodiment, but may also be equivalently replaced by disabling technology or clearing technology. For example, taking the Android smart platform as an example, the disabling of applications may be implemented through the "pm disable" system interface; and the clearing of applications may be implemented through the "am forcestop" system interface. Further, it should be understood that, when performing freezing detection control on applications, the corresponding conditions may be flexibly set depending on different freezing processing methods. For the convenience of understanding, this embodiment will be illustrated below in conjunction with an example of an application of the freezing technology in which a cyclic detection time interval being reached is taken as a trigger condition.

In this embodiment, the cyclic detection time interval may be used as the trigger condition to determine whether the freezing detection processing needs to be performed on the currently running applications, and the cyclic detection time interval may be updated according to requirements.

In this example, three cyclic detection time intervals $T_0$, $T_1$, and $T_2$ may be set. Further, in this embodiment, the values of $T_0$, $T_1$ and $T_2$ may be dynamically adjusted according to the actual running state of the terminal device. For example, according to the actual state of the terminal device, such as the screen-on/screen-off state, the low-battery/high-battery condition and the duration of continuous standby, the values of $T_0$, $T_1$ and $T_2$ may be dynamically assigned, for example, the values of $T_0$, $T_1$, $T_2$ in a low-battery condition of the terminal device are smaller than the values of $T_0$, $T_1$, $T_2$ in a high-battery condition of the terminal device. In this example, $T_0$ may be set to be greater than $T_1$, and $T_1$ greater than $T_2$. When the terminal device is turned on to run normally, the freezing management activates a cyclic detection with a default cyclic detection time interval of $T_0$ to monitor the running states of all controllable applications in a timely manner.

In this embodiment, when the terminal device is initially turned on, and when during use there are no frozen applications in the background and there are no abnormally running applications, the cyclic detection time interval T may be set as To.

When the situation changes from the absence of frozen applications to the presence of frozen applications in the terminal device during the use of the terminal device, i.e., when there are frozen applications running in the background of the terminal device that are outside the scope of freezing protection and there are no abnormally running applications in the terminal device, the cyclic detection time interval is updated such that $T=T_1$ (in an example, $T_0>T_1$).

When an abnormal application is detected running in the background of the terminal device (in an example, it is also possible to monitor the presence of abnormalities in applications running in the foreground), for example, there is an application with abnormal power consumption or other abnormal behaviors in the background of the terminal device, where the abnormal power consumption of the application is, for example, high CPU usage when the application process is running, or frequent use of terminal device resources (e.g., GPS, sensor, network download, etc.), and other abnormal behaviors are, for example, virus behaviors in the application, such as illegal access to user information resources in the terminal device and malicious destabilization of the terminal device, the cyclic detection time interval may be updated such that $T=T_2$ (in an example, $T_1>T_2$) to further enhance the efficiency of freezing control.

In this embodiment, in the process of timing using the timer, the time in which the terminal device is in normal sleep and standby is excluded, that is, the calculation of the cyclic detection time interval may include only the normal active running time of the terminal device, and when the cyclic detection time interval is reached, the process of freezing detection processing is triggered to freeze the applications that may satisfy the freezing condition, thereby reducing the abnormal power consumption of the system and eliminating security threats.

Based on the above examples, in this embodiment, the cyclic detection management of freezing of applications on the terminal device mainly includes the following parts:

cycle management, in which the cyclic detection time interval T may be determined based on the running states of applications in the background of the terminal device, and upon confirmation, the freezing detection processing is initiated after the timing reaches the time of the cyclic detection time interval T (in this example, the cyclic detection time interval T is calculated only for the normal active running time of the terminal device, while excluding the time of normal sleep and standby of the terminal device);

application state listening, in which a detection correction for the next cyclic detection time interval T is performed upon confirmation that the update to the cyclic detection time interval T is satisfied, so that power consumption behaviors or other abnormal behaviors of the applications may be controlled at a faster rate; and freezing execution, in which the process of freeze execution is triggered when the cyclic detection time interval T is reached, where the determination execution of freezing is carried out according to the actual running of applications, excluding freeze-protected applications (e.g. background downloading, background navigation, and so on). After this freezing execution operation is completed, the confirmation of the update to the next cyclic detection time interval is carried out.

Figure 3:
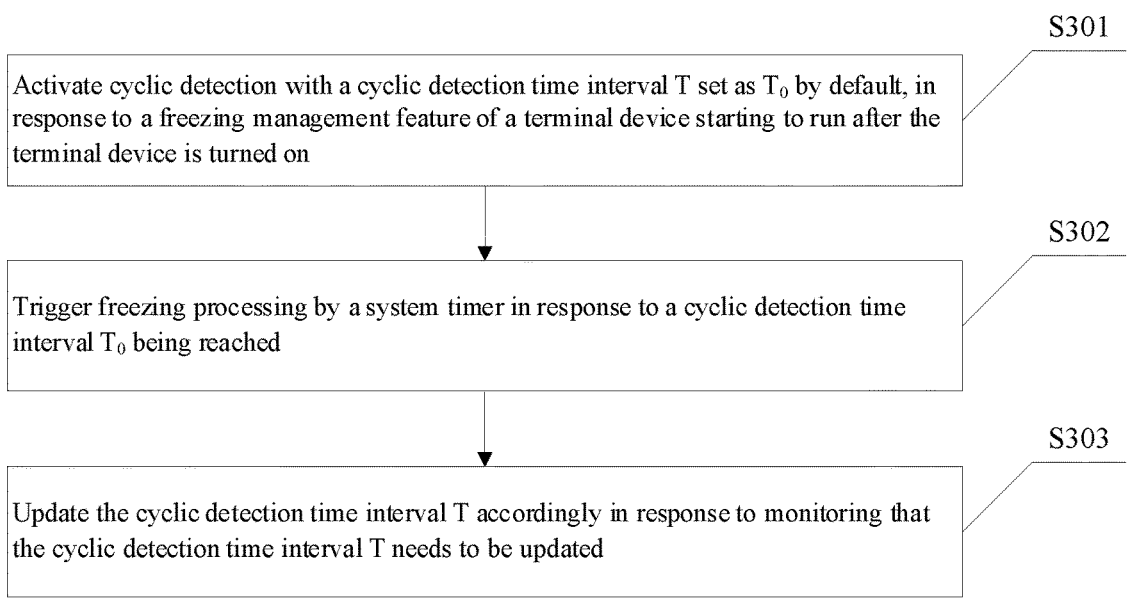
FIG. 3 is a flowchart of freezing control of a terminal device according to Embodiment II of the present disclosure.

For the convenience of understanding, this embodiment will be illustrated below with the process of freezing control of the terminal device as an example. With reference to FIG. 3, the process includes the following steps.

At step S301, after the terminal device is turned on, when the freezing management feature of the terminal device starts to run, the cyclic detection is activated, and the cyclic detection time interval T is set by default as $T_0$.

At step S302, after the cyclic detection time interval $T_0$ is reached, the system timer triggers the freezing processing, the background applications are traversed for determination processing of freezing, and applications satisfying the freezing condition are frozen immediately while those not satisfying the freezing condition are left for detection and determination again in the next cycle. After this operation, it is determined, based on the actual running situation of the background applications, whether the next cyclic detection time interval T needs to be updated.

At step S303, the cyclic detection time interval T is updated accordingly in response to monitoring that the cyclic detection time interval T needs to be updated (for example, a change from no frozen application to the presence of any frozen application, or an occurrence of abnormally running applications is monitored).

Figure 4:
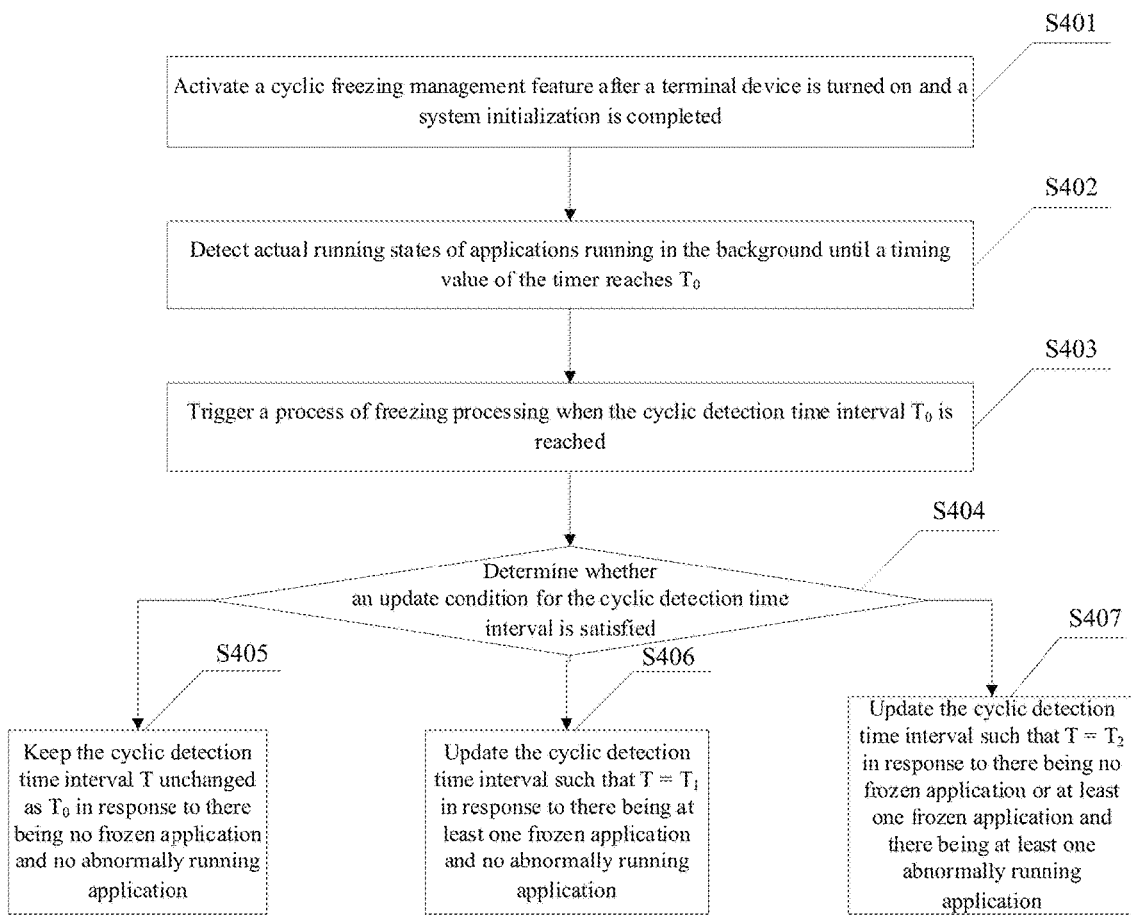
FIG. 4 is a flowchart of the cyclic timing management for freezing management according to Embodiment II of the present disclosure.

The process of cyclic timing management for freezing management is shown in FIG. 4, which includes the following steps.

At step S401, a cyclic freezing management feature is activated after the terminal device is turned on and the system initialization is completed. In this step, the cyclic detection time interval T may be set by default as $T_0$.

At step S402, actual running states of applications running in the background (for example, applications that are not in the current display interface are detected when the screen of terminal device is on, while all running applications are detected when the screen is off) are detected until a timing value of the timer reaches $T_0$. This includes, for example, traversing and detecting the states of all background applications, confirming whether there are abnormally running application among the applications running in the background, or whether there are applications that may be frozen, and making the decision about the next cyclic detection time interval T according to the actual situation.

At step S403, a process of freezing processing is triggered when the cyclic detection time interval $T_0$ is reached. This process may freeze some applications, or it may be found that there is no application that satisfies the freezing conditions.

At step S404, it is determined whether an update condition for the cyclic detection time interval is satisfied.

At step S405, if there are no frozen applications (i.e., the list of freezing control is empty) and no abnormally running applications (i.e., the list of abnormal applications is empty), the cyclic detection time interval T remains unchanged as $T_0$.

At step S406, if there is any frozen application (i.e., the list of freezing control is non-empty) and no abnormally running application (i.e., the list of abnormal applications is empty), the cyclic detection time interval is updated such that $T=T_1$.

At step S407, if there is no frozen application or at least one frozen application and there is at least one abnormally running application (i.e. the list of abnormal applications is non-empty), the cyclic detection time interval is updated such that $T=T_2$.

Figure 5:
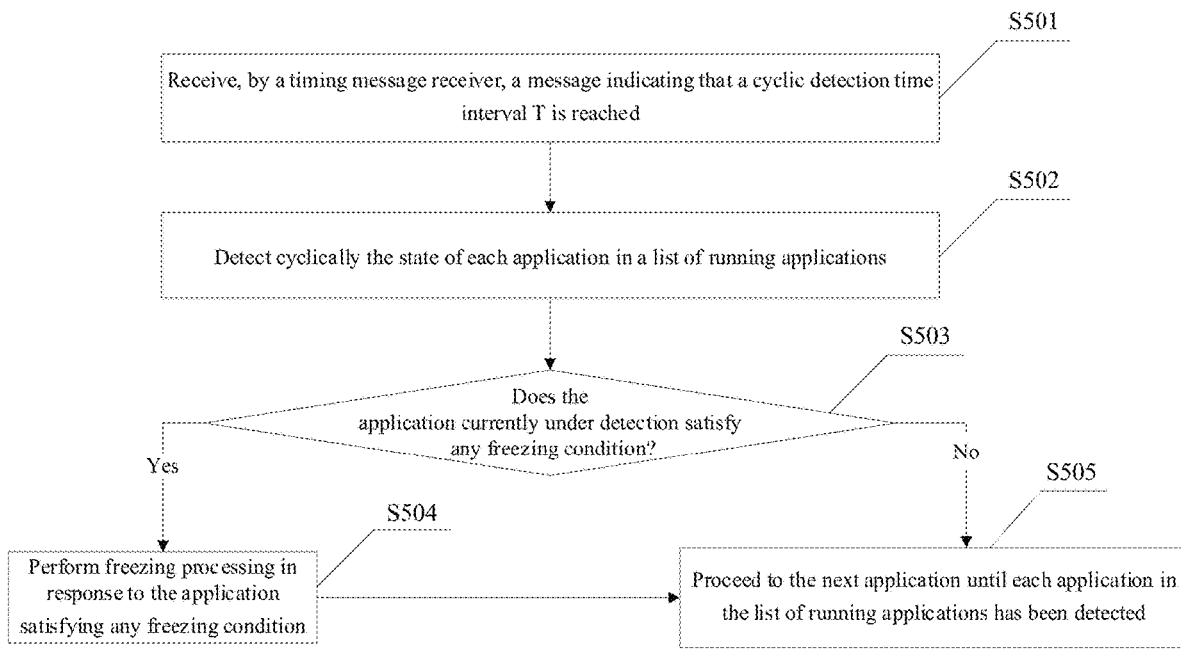
FIG. 5 is a flowchart of cyclic freezing detection processing according to Embodiment II of the present disclosure.

The cyclic freezing detection processing process is shown in FIG. 5, which includes the following steps.

At step S501, the execution of S502 is triggered in response to a timing message receiver receiving a message indicating that the cyclic detection time interval T is reached.

At step S502, the state of each application in a list of running applications is cyclically detected.

At step S503, it is determined whether the application currently under detection satisfies the freezing condition, and if so, the process proceeds to S504; otherwise, the process proceeds to S505.

At step S504, freezing processing is performed in response to the application currently under detection satisfying the freezing condition.

At step S505, the process proceeds to freezing detection processing for the next application until each application in the list of running applications has been detected.

Example Embodiment III

Figure 6:
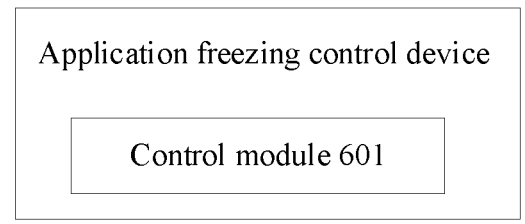
FIG. 6 is a schematic block diagram of an application freezing control device according to Embodiment III of the present disclosure.

This embodiment provides an application freezing control device, which may be provided within a terminal device, as shown in FIG. 6, including: a control module 601 configured to update, after freezing detection processing for currently running applications is triggered based on a current cyclic detection time interval, the cyclic detection time interval in response to determining, based on a current application running state of the terminal device, that the cyclic detection time interval needs to be updated; and continue to determine, based on the updated cyclic detection time interval, whether the freezing detection processing needs to be performed on the currently running applications.

The cyclic detection time interval in this embodiment is a condition under which the control module 601 may cyclically determine whether freezing detection processing needs to be performed on the currently running applications. The object of freezing control in this embodiment includes the currently running applications in the terminal device, which may include at least one of an application currently running in the foreground or an application currently running in the background. For example, in some examples, the freezing detection processing may be performed only for the applications currently running in the background; and in some other examples, the freezing detection processing may be performed for both the applications currently running in the background and the applications running in the foreground.

In this embodiment, the cyclic detection time interval may be flexibly set according to, but is not limited to, specific requirements of applications. In this embodiment, in response to determining that the cyclic detection time interval is satisfied, the control module 601 triggers the freezing detection processing for the currently running applications in the terminal device.

The control module 601 determines whether there is a target application in the currently running applications that qualifies for freezing processing, and if it is determined that there is a target application qualifying for freezing processing, freezing processing is performed on that target application.

For the convenience of understanding, this embodiment will be illustrated below in conjunction with several approaches to determine whether the cyclic detection time interval needs to be updated as examples. In this example, the control module 601 may determine, in response to at least one of the following cases, that the cyclic detection time interval needs to be updated.

Case one: a change from empty to non-empty as regards applications in a list of freezing control is detected.

Case two: a change from non-empty to empty as regards applications in the list of freezing control is detected.

Case three: a change from empty to non-empty as regards applications in a list of abnormal applications is detected.

Case four: a change from non-empty to empty as regards applications in the list of abnormal applications is detected.

In this example, when several cases among the above four cases are detected at the same time, it may be configured so that the cyclic detection time interval may be updated according to the cyclic detection time interval update method corresponding to any of the cases; and also, a corresponding priority may be set for each case, and the cyclic detection time interval may be updated according to the cyclic detection time interval update method corresponding to the case with a higher priority. For example, when case one and case three, or case two and case three, are detected at the same time, case three may be set to have a higher priority than case one and case two. For another example, when case four and case one are detected at the same time, case one may be set to have a higher priority than case four. For another example, when case four and case two are detected at the same time, case two and case four may be set to have the same priority, where case two and case four may adopt the same cyclic detection time interval update method.

For the convenience of understanding, this embodiment will be illustrated below with several example situations where the control module 601 updates the cyclic detection time interval:

the control module 601 decreases the cyclic detection time interval in response to detecting a change from empty to non-empty as regards applications in the list of freezing control and the maintenance of empty as regards applications in the list of abnormal applications, or in response to detecting a change from empty to non-empty as regards applications in the list of abnormal applications; or the control module 601 increases the cyclic detection time interval in response to detecting a change from non-empty to empty as regards applications in the list of freezing control and the maintenance of empty as regards applications in the list of abnormal applications, or in response to detecting a change from non-empty to empty as regards applications in the list of abnormal applications.

For example, the control module 601 may set three cyclic detection time intervals $T_0$, $T_1$ and $T_2$, and set $T_0$ to be greater than $T_1$ and $T_1$ to be greater than $T_2$. In this case, the control module 601 decreasing the cyclic detection time interval in response to detecting a change from empty to non-empty as regards applications in the list of freezing control and the maintenance of empty as regards applications in the list of abnormal applications, or in response to detecting a change from empty to non-empty as regards applications in the list of abnormal applications may include, but is not limited to:

the control module 601 updates the cyclic detection time interval from $T_0$ to $T_1$ in response to detecting a change from empty to non-empty as regards applications in the list of freezing control and the maintenance of empty as regards applications in the list of abnormal applications; and the control module 601 updates the cyclic detection time interval from $T_0$ or $T_1$ to $T_2$ in response to detecting a change from empty to non-empty as regards applications in the list of abnormal applications. For example, in response to detecting a change from empty to non-empty as regards applications in the list of abnormal applications, if the list of freezing control was empty as regards applications before, in which case the cyclic detection time interval used was $T_0$, then the cyclic detection time interval is updated from $T_0$ to $T_2$. For another example, in response to detecting a change from empty to non-empty as regards applications in the list of abnormal applications, if the list of freezing control was non-empty as regards applications before, in which case the cyclic detection time interval used was $T_1$, then the cyclic detection time interval is updated from $T_1$ to $T_2$.

In this example, the control module 601 increasing the cyclic detection time interval in response to detecting a change from non-empty to empty as regards applications in the list of freezing control and the maintenance of empty as regards applications in the list of abnormal applications, or in response to detecting a change from non-empty to empty as regards applications in the list of abnormal applications includes:

the control module 601 updates the cyclic detection time interval from $T_1$ to $T_0$ in response to detecting a change from non-empty to empty as regards applications in the list of freezing control and the maintenance of empty as regards applications in the list of abnormal applications, $T_0$ being greater than $T_1$; and the control module 601 updates the cyclic detection time interval from $T_2$ to $T_1$ or $T_0$ in response to detecting a change from non-empty to empty as regards applications in the list of abnormal applications. For example: in response to detecting a change from non-empty to empty as regards applications in the list of abnormal applications, if the list of freezing control is currently empty as regards applications, then the cyclic detection time interval is updated from $T_2$ to $T_1$. For another example: in response to detecting a change from non-empty to empty as regards applications in the list of abnormal applications, if the list of freezing control is non-empty as regards applications, then the cyclic detection time interval is updated from $T_2$ to $T_1$.

In some examples of this embodiment, the control module 601 may also dynamically update the value (for example, the above $T_0$, $T_1$ and $T_2$) of the cyclic detection time interval, thus further improving the rationality and flexibility of freezing control. For example, the value update condition for the cyclic detection time interval may be set so that the value of the cyclic detection time interval may be updated in response to detecting that the value update condition is satisfied, that is, in response to detecting that the value of the cyclic detection time interval needs to be updated.

For example, in some examples, the control module 601 detecting whether the value of the cyclic detection time interval needs to be updated may include, but is not limited to: based on the correspondence between the value of the cyclic detection time interval and at least one of a time of day, a battery level of the terminal device, a location of the terminal device, a screen-on or screen-off state of the terminal device, and a duration of continuous wake-up or sleep of the terminal device, the control module 601 determining whether the value of the cyclic detection time interval currently needs to be updated.

In this embodiment, in the process in which the control module 601 determines, based on the cyclic detection time interval, whether the freezing detection processing needs to be performed on the currently running applications, a timer may be used for timing, and when the timing value of the timer reaches the current value of the cyclic detection time interval, it is determined that the cyclic detection time interval is reached, and at this point, it is determined that the freezing detection processing needs to be performed the currently running application. In some examples of this embodiment, in the process of using the timer for timing in order to determine whether the freezing detection processing needs to be performed on the currently running applications, the control module 601 may control the timer to sleep and stop timing in response to detecting that the terminal device has entered a sleep state, and after detecting that the terminal device has switched from the sleep state to a wake-up state, wake up the timer to continue timing. That is, the timer also enters a sleep state when the terminal device enters the sleep state, so that the freezing of the terminal device may be further enhanced.

The function of the control module 601 in this embodiment may be realized by the processor of the terminal device where the application freezing control device is located. The application freezing control device provided in this embodiment not only can carry out cyclic freezing detection processing on the terminal device by setting the cyclic detection time interval, thus improving the rationality of the freezing detection processing and the freezing effect; but also can dynamically update the cyclic detection time interval in a rational manner during use, thus improving the flexibility of the freezing detection control and further improving the rationality of the freezing detection processing and the freezing effect, and also improving the safety performance of the terminal device.

Example Embodiment IV

Figure 7:
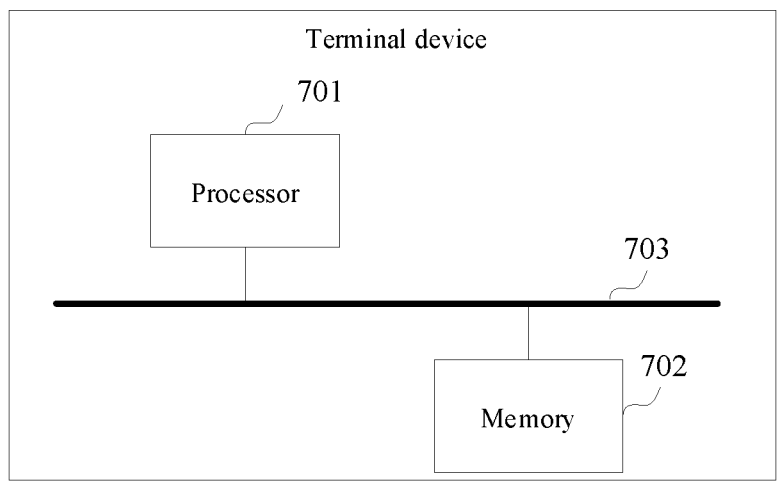
FIG. 7 is a schematic block diagram of a terminal device according to Embodiment IV of the present disclosure.

This embodiment provides a terminal device, where the terminal device in this embodiment may include various mobile terminal devices or may be a non-mobile terminal device. Referring to FIG. 7, the terminal device includes a processor 701, a memory 702 and a communication bus 703.

The communication bus 703 is configured to connect the processor 701 and the memory 702.

The processor 701 is configured to execute a computer program stored in the memory 702 to implement the steps of the application freezing control method illustrated in the above embodiments. Here, the memory 702 may be the memory of the terminal device itself; it may not include a memory provided on the terminal device part that may be separated from the terminal device; of course, it may be set, as required, to include the memory provided on the terminal device part that may be separated from the terminal device.

Figure 8:
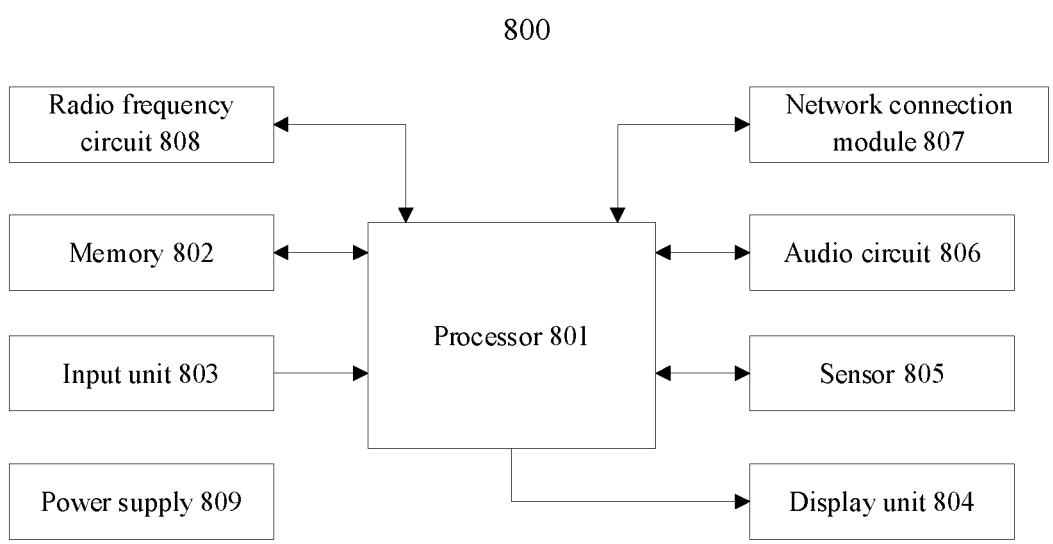
FIG. 8 is a schematic block diagram of another terminal device according to Embodiment IV of the present disclosure.

In this embodiment, the terminal device shown in FIG. 7 may be a mobile phone, a tablet computer, a laptop computer, a hand-held computer, a smart television, a mobile Internet-connected device, a wearable device, or any other terminal device on which a client application may be installed, or any other terminal device or device that can implement the application freezing control method of the embodiments of the present disclosure. This embodiment is illustrated below with the specific structure of a terminal device shown in FIG. 8 as an example. In a specific embodiment of the terminal device according to the embodiment of the present disclosure, terminal device 800 includes components such as a radio frequency circuit 808, a memory 802 of one or more non-transitory computer-readable storage media, an input unit 803, a display unit 804, a sensor 805, an audio circuit 806, a network connection module 807 (e.g., a Wi-fi module), one or more processors 801, and a power supply 809. It may be understood by those having ordinary skill in the art that the above structure does not constitute a limitation to the terminal device and may include more or fewer components than those listed. The radio frequency circuit 808 may be configured to receive and transmit communication signals, and receive information from the base station, which is then handed over to the processor 801 for processing. The memory 802 is configured to store software programs (including but not limited to the above computer programs) and modules, and the processor 801 is configured to execute various functions and data processing by running the software programs or modules of the memory 802. The input unit 803 may be configured to receive the input digital or character information. The input unit 803 may include various input devices, such as touch screen input and other input devices. The input unit 803 also converts each type of input information into computer instructions and sends them to the processor 801, and may also receive commands from the processor 801 for execution. The display unit 804 is configured to display information that is input by the user or information that is provided by the terminal device to the user and various graphical user interfaces on the terminal device. The terminal device 800 also includes at least one sensor, e.g., a light sensor, a motion sensor, etc. The terminal device 800 may also include components such as the audio circuit 806, the network connection module 807, and the power supply 809.

This embodiment further provides a computer-readable storage medium that includes a volatile or non-volatile, removable or non-removable medium implemented in any method or technology for storing information, such as computer-readable instructions, data structures, computer program modules, or other data. The computer-readable storage media include, but are not limited to, random access memory (RAM), read-only memory (ROM), electrically erasable programmable read-only memory (EEPROM), flash memory or other memory technologies, compact disc read-only memory (CD-ROM), digital video disc (DVD) or other optical disc storage, cassettes, magnetic tapes, magnetic disc storage or other magnetic storage devices, or any other media that can be configured to store desired information and can be accessed by computers.

In an example, the computer-readable storage medium in this embodiment may be configured to store one or more computer programs executable by one or more processors to implement the steps of the application freezing control method illustrated in the above embodiments.

This embodiment further provides a computer program (or computer software), which may be distributed on a computer-readable medium and may be executed by a computing device to implement at least one step of the application freezing control method illustrated in the above embodiments; and in some cases, at least one step illustrated or described may be performed in an order different from that described in the above embodiments.

This embodiment further provides a computer program product including a computer-readable device on which a computer program as illustrated above is stored. In this embodiment, the computer-readable device may include the computer-readable storage medium as illustrated above.

According to the application freezing control method and device, the terminal device and the computer-readable storage medium provided in the embodiments of the present disclosure, by setting a cyclic detection time interval, cyclic freezing detection processing may be performed on the terminal device according to that cyclic detection time interval, thus improving the rationality of freezing detection processing and the freezing effect; and after freezing detection processing for currently running applications is triggered based on the current cyclic detection time interval, the cyclic detection time interval may be updated in response to determining, based on the current application running state of the terminal device, that the cyclic detection time interval needs to be updated, and subsequently, based on the updated cyclic detection time interval, the determination may be continued as to whether the freezing detection processing needs to be performed on the currently running applications, that is, the cyclic detection time interval provided in the embodiments of the present disclosure may also be dynamically updated during use, thereby improving the flexibility of freezing detection control and further improving the rationality of freezing detection processing and the freezing effect, thus enhancing the satisfaction of the user experience.

As can be seen, it should be understood by those having ordinary skill in the art that all or some of the steps in the methods disclosed above, functional modules/units in the systems and devices disclosed above may be implemented as software (which may be implemented by computer program code executable by a computing device), firmware, hardware, and appropriate combinations thereof. In the hardware implementation, the division between functional modules/units mentioned in the above description does not necessarily correspond to the division of physical components; for example, a physical component may have multiple functions, or a function or step may be performed cooperatively by several physical components. Some or all of the physical components may be implemented as software executed by a processor, such as a central processing unit, a digital signal processor or a microprocessor, or as hardware, or as an integrated circuit, such as an application specific integrated circuit.

Furthermore, it is well known to those having ordinary skill in the art that communication media typically contain computer-readable instructions, data structures, computer program modules or other data in a modulated data signal such as a carrier wave or other transmission mechanism, and may include any information delivery media. Therefore, the present disclosure is not limited to any particular combination of hardware and software.

The foregoing is a further detailed description of the embodiments the present disclosure in conjunction with particular implementations, and specific implementations of the present disclosure should not be construed as being limited to the description. For those having ordinary skill in the art to which the present disclosure pertains, without departing from the concept of the present disclosure, several simple deductions or substitutions can be made, which should be regarded as falling within the scope of the present disclosure.

The invention claimed is:

1. An application freezing control method applied to a terminal device, comprising:
    updating, after freezing detection processing for currently running applications is triggered based on a current cyclic detection time interval, the cyclic detection time interval in response to determining, based on a current application running state of the terminal device, that a value of the cyclic detection time interval needs to be updated, wherein, based on the correspondence between the value of the cyclic detection time interval and at least one of a time of day, a battery level of the terminal device, a location of the terminal device, a screen-on or screen-off state of the terminal device, and a duration of continuous wake-up or sleep of the terminal device, determining whether the value of the cyclic detection time interval currently needs to be updated; and
    determining, based on the updated cyclic detection time interval, whether the freezing detection processing needs to be performed on the currently running applications.

2. The application freezing control method of claim 1, wherein it is determined that the cyclic detection time interval needs to be updated in response to at least one of:
    detecting a change from empty to non-empty as regards applications in a list of freezing control;
    detecting a change from non-empty to empty as regards applications in the list of freezing control;
    detecting a change from empty to non-empty as regards applications in a list of abnormal applications; or
    detecting a change from non-empty to empty as regards applications in the list of abnormal applications;
    wherein the list of freezing control is configured to store applications that are currently under freezing control, and the list of abnormal applications is configured to store applications that are currently running abnormally.

3. The application freezing control method of claim 2, wherein updating the cyclic detection time interval comprises at least one of:
    decreasing the cyclic detection time interval in response to detecting a change from empty to non-empty as regards applications in the list of freezing control and the maintenance of empty as regards applications in the list of abnormal applications, or in response to detecting a change from empty to non-empty as regards applications in the list of abnormal applications; or
    increasing the cyclic detection time interval in response to detecting a change from non-empty to empty as regards applications in the list of freezing control and the maintenance of empty as regards applications in the list of abnormal applications, or in response to detecting a change from non-empty to empty as regards applications in the list of abnormal applications.

4. The application freezing control method of claim 3, wherein decreasing the cyclic detection time interval in response to detecting a change from empty to non-empty as regards applications in the list of freezing control and the maintenance of empty as regards applications in the list of abnormal applications, or in response to detecting a change from empty to non-empty as regards applications in the list of abnormal applications comprises:
    updating the cyclic detection time interval from T0 to T1 in response to detecting a change from empty to non-empty as regards applications in the list of freezing control and the maintenance of empty as regards applications in the list of abnormal applications, T0 being greater than T1; and
    updating the cyclic detection time interval from T0 or T1 to T2 in response to detecting a change from empty to non-empty as regards applications in the list of abnormal applications, T1 being greater than T2.

5. The application freezing control method of claim 4, further comprising:

timing with a timer to determine, based on the cyclic detection time interval, whether the freezing detection processing needs to be performed on the currently running applications;

controlling the timer to sleep and stop timing in response to detecting that the terminal device has entered a sleep state; and waking up the timer to continue timing in response to detecting that the terminal device has switched from the sleep state to a wake-up state.

6. The application freezing control method of claim 4, wherein performing the freezing detection processing on the currently running applications comprises:

in response to a detection of a target application in the currently running applications that qualifies for freezing processing, performing the freezing processing on the target application, the freezing processing comprising one of disabling, freezing and clearing the target application.

7. The application freezing control method of claim 3, wherein increasing the cyclic detection time interval in response to detecting a change from non-empty to empty as regards applications in the list of freezing control and the maintenance of empty as regards applications in the list of abnormal applications, or in response to detecting a change from non-empty to empty as regards applications in the list of abnormal applications comprises:

updating the cyclic detection time interval from T1 to T0 in response to detecting a change from non-empty to empty as regards applications in the list of freezing control and the maintenance of empty as regards applications in the list of abnormal applications, T0 being greater than T1; and updating the cyclic detection time interval from T2 to T1 or T0 in response to detecting a change from non-empty to empty as regards applications in the list of abnormal applications, T1 being greater than T2.

8. The application freezing control method of claim 7, further comprising:

timing with a timer to determine, based on the cyclic detection time interval, whether the freezing detection processing needs to be performed on the currently running applications;

controlling the timer to sleep and stop timing in response to detecting that the terminal device has entered a sleep state; and waking up the timer to continue timing in response to detecting that the terminal device has switched from the sleep state to a wake-up state.

9. The application freezing control method of claim 7, wherein performing the freezing detection processing on the currently running applications comprises:

in response to a detection of a target application in the currently running applications that qualifies for freezing processing, performing the freezing processing on the target application, the freezing processing comprising one of disabling, freezing and clearing the target application.

10. The application freezing control method of claim 3, further comprising:

timing with a timer to determine, based on the cyclic detection time interval, whether the freezing detection processing needs to be performed on the currently running applications;

controlling the timer to sleep and stop timing in response to detecting that the terminal device has entered a sleep state; and waking up the timer to continue timing in response to detecting that the terminal device has switched from the sleep state to a wake-up state.

11. The application freezing control method of claim 3, wherein performing the freezing detection processing on the currently running applications comprises:

in response to a detection of a target application in the currently running applications that qualifies for freezing processing, performing the freezing processing on the target application, the freezing processing comprising one of disabling, freezing and clearing the target application.

12. The application freezing control method of claim 2, wherein performing the freezing detection processing on the currently running applications comprises:

in response to a detection of a target application in the currently running applications that qualifies for freezing processing, performing the freezing processing on the target application, the freezing processing comprising one of disabling, freezing and clearing the target application.

13. The application freezing control method of claim 1, wherein performing the freezing detection processing on the currently running applications comprises:

in response to a detection of a target application in the currently running applications that qualifies for freezing processing, performing the freezing processing on the target application, the freezing processing comprising one of disabling, freezing and clearing the target application.

14. An application freezing control device, comprising:

a control module configured to update, after freezing detection processing for currently running applications is triggered based on a current cyclic detection time interval, a value of the cyclic detection time interval in response to determining, based on a current application running state of the terminal device, that the cyclic detection time interval needs to be updated, wherein, based on the correspondence between the value of the cyclic detection time interval and at least one of a time of day, a battery level of the terminal device, a location of the terminal device, a screen-on or screen-off state of the terminal device, and a duration of continuous wake-up or sleep of the terminal device, determining whether the value of the cyclic detection time interval currently needs to be updated; and to determine, based on the updated cyclic detection time interval, whether the freezing detection processing needs to be performed on the currently running applications.

15. A terminal device, comprising:

a processor;

a memory storing a computer program; and a communication bus configured to connect the processor and the memory;

wherein the processor is configured to execute the computer program to implement an application freezing control method applied to a terminal device, comprising:

updating, after freezing detection processing for currently running applications is triggered based on a current cyclic detection time interval, a value of the cyclic detection time interval in response to determining, based on a current application running state of the terminal device, that the cyclic detection time interval needs to be updated, wherein, based on the correspondence between the value of the cyclic detection time interval and at least one of a time of day, a battery level of the terminal device, a location of the terminal device, a screen-on or screen-off state of the terminal device, and a duration of continuous wake-up or sleep of the terminal device, determining whether the value of the cyclic detection time interval currently needs to be updated; and determining, based on the updated cyclic detection time interval, whether the freezing detection processing needs to be performed on the currently running applications.

16. A non-transitory computer-readable storage medium storing at least one computer program executable by at least one processor to implement an application freezing control method applied to a terminal device, comprising:

updating, after freezing detection processing for currently running applications is triggered based on a current cyclic detection time interval, a value of the cyclic detection time interval in response to determining, based on a current application running state of the terminal device, that the cyclic detection time interval needs to be updated, wherein, based on the correspondence between the value of the cyclic detection time interval and at least one of a time of day, a battery level of the terminal device, a location of the terminal device, a screen-on or screen-off state of the terminal device, and a duration of continuous wake-up or sleep of the terminal device, determining whether the value of the cyclic detection time interval currently needs to be updated; and determining, based on the updated cyclic detection time interval, whether the freezing detection processing needs to be performed on the currently running applications.

* * * * *